July 3, 1962   P. L. RUBEN ET AL   3,041,934
OBJECTIVE FOR MICROSCOPE
Filed Nov. 10, 1960
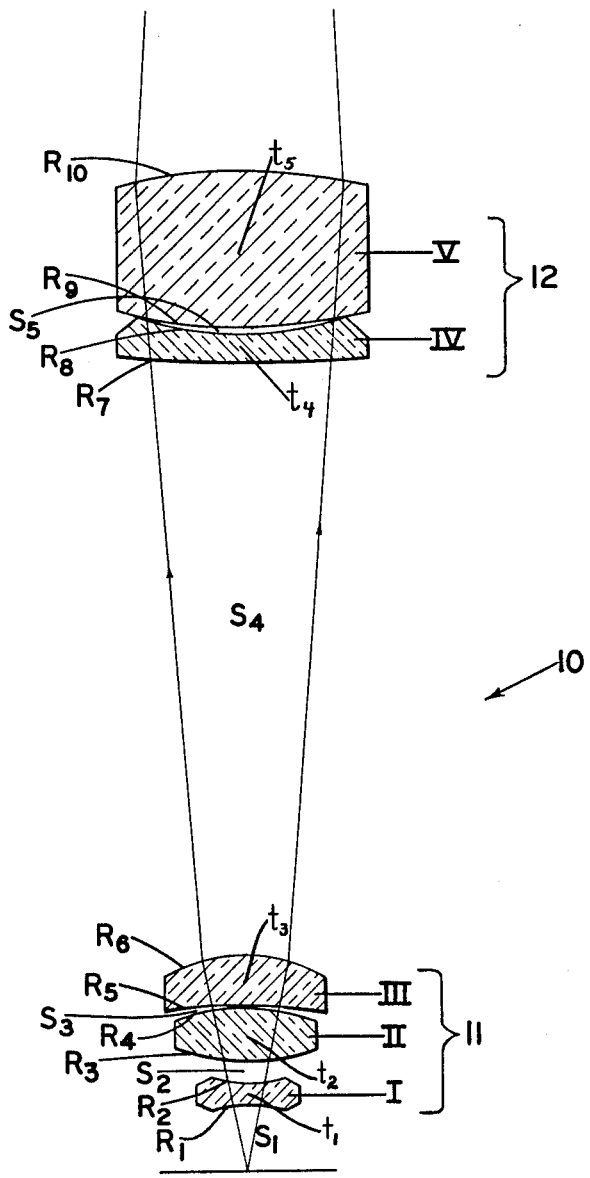
PAUL L. RUBEN
GEORGE F. ZIEGLER
INVENTORS
BY Frank C. Parker
ATTORNEY 3,041,934
OBJECTIVE FOR MICROSCOPE
Paul L. Ruben, Rochester, and George F. Ziegler, Gates, N.Y., assignors to Bausch & Lomb Incorporated, Rochester, N.Y., a corporation of New York
Filed Nov. 10, 1960, Ser. No. 68,479
3 Claims. (Cl. 88—57)

This invention relates to an optical objective for microscopes, metalloscopes and the like, and particularly relates to improvements in objectives of comparatively low powers.

It is an object of this invention to provide a novel optical objective for microscopes and the like having a numerical aperture of substantially 0.20 and providing an excellent flat field of at least 20 mm. diameter in the eyepiece focal plane.

It is a further object to provide such an objective having very low distortion and a superior spherical zone even when used at full aperture, said objective aberrationwise being diffraction limited and having very well corrected longitudinal and lateral color as well as monochromatic image aberrations, said objective further being simple in structure and low in cost considering the high grade performance thereof.

Further objects and advantages will be apparent in the details of construction and arrangement of parts of the present objective by referring to the specification herebelow taken together with the accompanying drawing wherein the single FIGURE thereof shows a preferred form of this invention wherein the objective generally is represented by the numeral 10.

According to this invention, the objective 10 is composed of a front group 11 of lenses and a rear group 12 of lenses, the positive focal length of the front group 11 being from .80 to .85 times the positive focal length of the rear group 12. These two lens groups are separated from each other by an air space $S_4$ having an axial dimension limited by the mathematical expression $$1.18F < S_4 < 1.28F$$

wherein F designates the equivalent focal length of the entire objective 10. The above-disclosed relationship between the focal lengths of the front and rear lens groups 11 and 12 respectively, together with the specification of the distance $S_4$ are found to contribute greatly to the attainment of an extremely low Petzval sum of $-.000075$, the other influential factors being given hereinafter.

Said front lens group 11 comprises three single air spaced lenses, the foremost being a negative double concave lens designated by I, a positive double convex lens designated II, and a positive meniscus lens designated III and having its surface of strongest curvature on the rear side. The first lens I of the front lens group 11 has a negative focal length $F_I$ which is substantially numerically between .13 and .15 times the focal length of the front group, the second lens II has a positive focal length $F_{II}$ which is substantially between .28 and .34 times the focal length of the front group, and the third lens III has a positive focal length which is substantially between .65 and .80 times the focal length of the front group.

Rearwardly of the air space $S_4$, the rear lens group 12 comprises a front negative meniscus lens designated IV having the surface of strongest curvature at the rear, and a positive double convex lens designated V, spaced therefrom, the negative focal length $F_{IV}$ of the negative lens IV being numerically substantially between 1.4 and 1.7 times the positive focal length $F_V$ of the rearmost lens V.

It will be noted that the front and the rear lens groups 11 and 12 respectively both include a negative lens, the purpose of which is to contribute significantly to the flattening of the field and the achromatism of the objective 10, as well as to assist in providing a low image distortion of .56% comparable to the best achromatic objectives. To this end, the following relative values between the refractive index of the individual lenses and between the individual Abbe numbers pertaining thereto has been determined to be most effective.

Negative lens I  $\}n_D \geq 1.700$
Negative lens IV $\,\nu \leq 31.0$
$n_D$ (lens I) $-n_D$ (lens II) $\geq .080$
$n_D$ (lens II) $-n_D$ (lens III) $\leq .100$
$\nu$ (lens I) $-\nu$ (lens II) $\geq 20.0$
$\nu$ (lens II) $-\nu$ (lens III) $\leq 15.0$
$n_D$ (lens IV) $-n_D$ (lens V) $\geq .060$
$\nu$ (lens V) $-\nu$ (lens IV) $\geq 20.0$ This invention provides an objective 10 which is strictly diffraction limited over the entire field which it produces, and in achieving this feature, other properties of the objective are greatly improved. Among these properties is the very superior spherical zone which is mostly achieved by advantageous use of weak curvatures, especially in lenses where the image rays strike the curve at the greatest distance from the axis. The amount of spherical zone is only about one-sixth of the value of a diffraction limited optical system.

All of the optical parameters given hereinafter are judiciously selected after much experimentation and calculation to achieve a very high grade of longitudinal and lateral color correction.

Prescribed ranges of values of certain of the above-mentioned parameters or constructional data which yield the above-mentioned advantageous features for the objective 10 have been found to be as follows, wherein the focal length of the objective 10 is designated by F, the individual focal lengths are designated by $F_I$, $F_{II}$, $F_{III}$, $F_{IV}$, $F_V$ of the constituent lenses named in order from the front toward the rear, $S_1$, $S_2$, $S_3$, $S_4$, $S_5$ represent the air spaces naming first the air space preceding the front lens I, $R_1$ to $R_{10}$ represent the radii of the lens surfaces named in order, and $t_1$ to $t_5$ designate the respective axial lens thicknesses.

$.20F < -F_I < .25F$
$.45F < F_{II} < .55F$
$.70F < F_{III} < .75F$
$1.2F < -F_{IV} < 1.3F$
$.80F < F_V < .85F$
$.12F < S_1 < .14F$
$.03F < S_2 < .04F$
$.004F < S_3 < .005F$
$1.18F < S_4 < 1.28F$
$.0005F < S_5 < .0006F$
$.28F < -R_1 < .34F$
$.33F < R_2 < .39F$
$.68F < R_3 < .82F$
$.42F < -R_4 < .50F$
$.90F < -R_5 < 1.20F$
$.26F < -R_6 < .32F$
$R_7 > \pm 4.0F$
$.68F < R_8 < .82F$
$.70F < R_9 < .84F$
$1.10F < -R_{10} < 1.34F$
$.048F < t_1 < .058F$
$.096F < t_2 < 1.16F$
$.103F < t_3 < 1.25F$
$.058F < t_4 < .070F$
$.30F < t_5 < .36F$

3

One example of a preferred form of this invention is given in the table herebelow wherein the equivalent focus E.F. is 18.70, the magnification is 10 ×, and the numerical aperture, N.A. is 0.20 and wherein $R_1$ to $R_{10}$ are the radii of the lens surfaces, $t_1$ to $t_5$ are the axial thicknesses of the respective lenses, $S_1$ to $S_5$ are the spaces between said lenses, $F_I$ to $F_V$ are the individual focal lengths of the respective lenses numbering the subscripts from the front or object side of the objective, $n_D$ are the refractive indices and $\nu$ are the Abbe numbers thereof, all dimensions being given in millimeters.

[E.F.=18.70. Magnification=10 ×. N.A.=0.20]

| Lens | Radius of Lens Surfaces | Thickness | Spacing | Focal Length | $n_D$ | $\nu$ |
|---|---|---|---|---|---|---|
| I | $R_1 = -5.861$ | $t_1 = 1.0$ | $S_1 = 2.39$ | $F_I = -4.23$ | 1.720 | 29.3 |
|  | $R_2 = 6.792$ |  | $S_2 = .70$ |  |  |  |
| II | $R_3 = 14.191$ | $t_2 = 2.0$ |  | $F_{II} = 9.54$ | 1.588 | 53.4 |
|  | $R_4 = -8.790$ |  | $S_3 = .08$ |  |  |  |
| III | $R_5 = -20.893$ | $t_3 = 2.1$ |  | $F_{III} = 13.61$ | 1.517 | 64.5 |
|  | $R_6 = -5.445$ |  | $S_4 = 23.0$ |  |  |  |
| IV | $R_7 = 83.176$ | $t_4 = 1.2$ |  | $F_{IV} = -23.94$ | 1.720 | 29.3 |
|  | $R_8 = 14.191$ |  | $S_5 = .011$ |  |  |  |
| V | $R_9 = 14.454$ | $t_5 = 6.2$ |  | $F_V = 15.33$ | 1.617 | 53.9 |
|  | $R_{10} = -22.909$ |  |  |  |  |  |

From the foregoing, it will be comprehended that an objective for microscopes and the like has been provided which is simple in structure and is designed for low cost of manufacture, but which is nevertheless designed for high grade performance in accordance with the stated objects of this invention.

Although only one preferred embodiment of this invention has been shown and described in detail, it will be understood that other embodiments are possible and changes may be made in the details and arrangements of the parts without departing from the spirit of the invention as defined in the claims herebelow.

What is claimed is:

1. A microscope objective having a numerical aperture of substantially 0.20 and an image magnification of at least 10 ×, the combination of a front double concave lens I spaced a distance $S_1$ rearwardly of an object surface to be observed, a double convex lens II spaced a distance $S_2$ rearwardly of lens I, a meniscus lens III spaced a distance $S_3$ rearwardly of lens II and being concave toward the front with the rear surface thereof more strongly curved than the front surface thereof, a meniscus lens IV having the convex surface thereof facing the front and the rear surface thereof having the strongest curvature and being spaced a distance $S_4$ rearwardly of lens III, and a double convex lens V spaced a distance $S_5$ rearwardly of lens IV, all of said lenses being mutually optically aligned and air spaced, the respective individual focal lengths $F_I$, $F_{II}$, $F_{III}$, $F_{IV}$, $F_V$, and the respective air spaces $S_1$, $S_2$, $S_3$, $S_4$, $S_5$ all named in order from the front toward the rear being as stated in the statement of inequalities below wherein F denotes the equivalent focus of said objective, $.20F < -F_I < .25F$
$.45F < F_{II} < .75F$
$.70F < F_{III} < .75F$
$1.2F < -F_{IV} < 1.3F$
$.80F < F_V < .85F$
$.12F < S_1 < .14F$ $.03F < S_2 < .04F$
$.004F < S_3 < .005F$
$1.18F < S_4 < 1.28F$
$.0005F < S_5 < .0006F$ wherein the refractive index of the glass from which the double concave and the meniscus negative lenses are made is 1.700 or greater and the Abbe number thereof has a maximum values of substantially 31.0, the front double convex positive lens having a refractive index which is at least .080 less than said negative lenses and is less than or equal to .100 over the refractive index of the meniscus positive lens, the difference in Abbe numbers between the front double convex lens and negative lenses being at least 20.0 and the difference in Abbe numbers of the front double convex lens and meniscus positive lens being less than or equal to 15.0, the difference in refractive index between said meniscus negative lenses and the rear double convex lens being at least .060 and the difference of Abbe numbers therefor being at least 20.0.

2. An optical objective for a microscope or the like having a numerical aperture of 0.20 and a magnification of at least 10 ×, said objective comprising five optically aligned and air spaced lens which when named in order from the front are a front double concave negative lens, a double convex positive lens, a positive meniscus lens, a negative meniscus lens, and a double convex positive lens, the symbols $F_I$, $F_{II}$, $F_{III}$, $F_{IV}$ and $F_V$ representing the individual focal lengths of the above-named lenses respectively in the order named, $S_1$, $S_2$, $S_3$, $S_4$ and $S_5$ representing the intervening air spaces wherein $S_1$ is the space between the object surface and the double concave lens, F represents the equivalent focus of the objective, $R_1$ to $R_{10}$ designate the radii of the lens surfaces and $t_1$ to $t_5$ designate the thicknesses of the respective lenses, $.20F < -F_I < .25F$
$.45F < F_{II} < .55F$
$.70F < F_{III} < .75F$
$1.2F < -F_{IV} < 1.3F$
$.80F < F_V < .85F$
$.12F < S_1 < .14F$
$.03F < S_2 < .04F$
$.004F < S_3 < .005F$
$1.18F < S_4 < 1.28F$
$.0005F < S_5 < .0006F$
$.28F < -R_1 < .34F$
$.33F < R_2 < .39F$
$.68F < R_3 < .82F$
$.42F < -R_4 < .50F$
$.90F < -R_5 < 1.20F$
$.26F < -R_6 < .32F$
$R_7 > \pm 4.0F$
$.68F < R_8 < .82F$
$.70F < R_9 < .84F$
$1.10F < -R_{10} < 1.34F$
$.048F < t_1 < .058F$
$.096F < t_2 < .116F$
$.103F < t_3 < .125F$
$.058F < t_4 < .070F$
$.30F < t_5 < .36F$ 3. A microscope objective having a numerical aperture of substantially 0.20 and a magnification of at least 10 ×, said objective comprising five single lenses arranged in two positive optically aligned groups, the constructional data of said objective being specified in the following table wherein $R_1$ to $R_{10}$ are the radii of the lens surfaces, $t_1$ to $t_5$ are the axial thicknesses of said lenses, $S_1$ to $S_5$ are the air spaces and $S_1$ is the space between the object surface and the first lens, $F_I$, $F_{II}$, $F_{III}$, $F_{IV}$ and $F_V$ are the focal lengths of the respective lenses, $n_D$ is the refractive index and $\nu$ is the Abbe number or the relative reciprocal dispersion of the glasses from which the lenses are made,

[E.F.=18.70. Magnification=10 X. N.A.=0.20]

| Lens | Radius of Lens Surfaces | Thickness | Spacing | Focal Length | $n_D$ | $\nu$ |
|---|---|---|---|---|---|---|
| I | $R_1 = -5.861$ $R_2 = 6.792$ | $t_1 = 1.00$ | $S_1 = 2.39$ $S_2 = .70$ | $F_I = -4.23$ | 1.720 | 29.3 |
| II | $R_3 = 14.191$ $R_4 = -8.790$ | $t_2 = 2.00$ | $S_3 = .08$ | $F_{II} = 9.54$ | 1.588 | 53.4 |
| III | $R_5 = -20.893$ $R_6 = -5.445$ | $t_3 = 2.10$ | $S_4 = 23.00$ | $F_{III} = 13.61$ | 1.517 | 64.5 |
| IV | $R_7 = 83.176$ $R_8 = 14.191$ | $t_4 = 1.20$ | $S_5 = .011$ | $F_{IV} = -23.94$ | 1.720 | 29.3 |
| V | $R_9 = 14.454$ $R_{10} = -22.909$ | $t_5 = 6.20$ | | $F_V = 15.33$ | 1.617 | 53.9 |

References Cited in the file of this patent

UNITED STATES PATENTS 2,206,155    Boegehold _____ July 2, 1940

FOREIGN PATENTS 306,084    Great Britain _____ Oct. 17, 1929